United States Patent

Wimber et al.

[11] 4,030,896
[45] June 21, 1977

[54] REGENERATION OF ADSORBENTS

[75] Inventors: Hans Wimber; Wilhelm Rohde; Jorg Reyhing, all of Munich, Germany

[73] Assignee: Linde Aktiengesellschaft, Wiesbaden, Germany

[22] Filed: Apr. 8, 1976

[21] Appl. No.: 675,230

[30] Foreign Application Priority Data

Apr. 14, 1975 Germany .......................... 2516223

[52] U.S. Cl. ...................................... 55/33; 55/62; 55/68; 165/10

[51] Int. Cl.[2] ......................................... B01D 53/03

[58] Field of Search .............. 55/33, 62, 74, 75, 27, 55/68; 165/4.7, 9.1, 9.3; 252/420

[56] References Cited

UNITED STATES PATENTS

| | | | |
|---|---|---|---|
| 3,405,507 | 10/1968 | Spencer et al. ........................ | 55/62 |
| 3,533,221 | 10/1970 | Tamura .............................. | 55/62 X |
| 3,594,984 | 7/1971 | Toyama et al. ........................ | 55/33 |
| 3,712,027 | 1/1973 | Hasz .................................. | 55/62 X |

FOREIGN PATENTS OR APPLICATIONS

| | | | |
|---|---|---|---|
| 398,010 | 9/1933 | United Kingdom .............. | 252/420 |

*Primary Examiner*—Thomas G. Wyse
*Assistant Examiner*—Robert H. Spitzer
*Attorney, Agent, or Firm*—Millen & White

[57] ABSTRACT

In an adsorption process for the separation of gases, e.g., in the separation of $CO_2$ and $H_2O$ from air, wherein gas to be separated is passed through one of several interchangeably connected adsorbers, and a main stream of regenerating gas is passed in two periods through another of said interchangeably connected adsorbers, the first period being a heating period to desorb the adsorbent, and the second period being a cooling period to cool the adsorbent to adsorption temperatures, during the cooling period, branching a partial stream of regenerating gas from the main stream, heating the partial stream with the means, and passing resultant heated partial stream over a heat accumulator, and during the heating period, passing the main stream of regenerating gas across said heat accumulator to recover the heat stored in the accumulator during the cooling period, and then further heating the main stream with the heating means to heating period regeneration temperatures.

15 Claims, 5 Drawing Figures

REGENERATION OF ADSORBENTS

BACKGROUND OF THE INVENTION

This invention relates to an improved system and apparatus for the regeneration of cyclically reversible adsorbers.

It is old, especially in the cryogenic separation of gases, to regenerate adsorbers during down-time periods, first with heated regeneration gas to desorb impurities, and then with cold regenerating gas to cool the adsorber to adsorption temperatures. In practice, preferred design considerations dictate that the time period for heating the adsorber be substantially shorter than the time of the subsequent cooling period. Thus, the regenerating gas must be heated up in a relatively short time during each heating period, and for this purpose, the heater must have a very high thermal capacity in order to meet the rate of demand. The larger the thermal capacity of an installation, the higher the investment cost and indirect operating costs (e.g., depreciation), and thus the higher is the resultant cost of the energy. Accordingly, the surge demand results in a system having a relatively high energy cost for the heating of the regenerating gas.

SUMMARY OF THE INVENTION

An object of this invention is to provide an improved process for the regeneration of cyclically reversible adsorbers, and in particular to the lowering of the energy cost attributable to the heating of the regenerating gas.

Another object is to provide apparatus for conducting the improved process in an especially expeditious manner.

Upon further study of the specification and appended claims, further objects and advantages of this invention will become apparent to those skilled in the art.

To attain the objects of the process aspect of this invention, during the heating of the adsorber, the regenerating gas is passed through a heat accumulator and a heater (preferably in that sequence), before admission into the adsorber, and that at least during a portion of the time period for cooling the adsorber, a partial stream of regenerating gas from the main stream of regenerating gas is branched off and passed in sequence, first across a heater and then a heat accumulator. (The term "accumulator" is synonymous with "regenerator", and is used herein to avoid confusion.) In this way the capacity of the heater can be continuously utilized, and the heat in the heat accumulator can be beneficially used in a subsequent heating period. Consequently, the capacity of the heater may be much lower than in prior systems because the regenerating gas is heated up substantially by passing through the heat accumulator. In other words, whereas the overall energy requirements remain substantially the same, the use of the heat accumulator serves to dampen the fluctuations in the demand curve.

For simplified line and valve control, the partial stream of regenerating gas can be branched off from the main stream of regenerating gas before the regenerating gas is passed into the adsorber. Conversely, for maximum energy utilization, it is preferred in many cases, to branch off a gas at the discharge end of the adsorber. The energy saving is attributable to the fact the regenerating gas withdrawn from the discharge end of the adsorber during its cooling period is warmer than the regenerating gas entering the adsorber.

Thus, with two parallel connected adsorbers, the time period during which the adsorber is cooled coincides with the time period during which the heat accumulator is heated. The regenerating gas passed across the heat accumulator and heater or vice versa can then continuously withdraw heat from or feed theat into the heat accumulator.

The invention is especially useful in the cryogenic field where the adsorption of gases occurs at about 278° to 313° K, the adsorber must be heated to about 423° to 473° K for purposes of regeneration, and the main regenerating gas is available at a temperature of about 273° to 313° K. Such adsorption systems are used, for example in the removal of impurities from air (prior to fractionation thereof), as well as from natural and synthetic gaseous hydrocarbons, such as natural gas, steam reformer gas or partial oxidation gas, wherein the impurities are $H_2O$, $CO_2$ and $H_2S$.

Where the adsorbers are used prior to air fractionation, the adsorbers are generally operated at about 278° to 313° K, and are heated to regeneration temperatures of about 423° to 473° K with a nitrogen-containing fractionation byproduct having a temperature of about 273° to 313° K prior to being heated to to regenerating temperature.

Preferred apparatus for conducting the method comprises the heater and the heat accumulator being disposed in the same housing. This substantially reduces construction cost for the heat accumulator and heater, and also obviates the need for conduits, etc., which would otherwise be necessary for separate installations.

In a particularly preferred embodiment of the apparatus, the heater is mounted substantially axially in a thermally insulated pipe surrounded concentrically by the accumulator packing of the heat accumulator. This arrangement serves to reduce heat loss and to increase the effectiveness of the sequential flow of the regenerating gas. The control of the gas streams within the container is simple, inasmuch as the heat accumulator and the heater are serially connected and regenerating gas is valved so it can first enter either the heat accumulator or the heater. Conventional cyclically switchable valves are used to control fluid flow within the overall system.

The thermal capacity of the heater is dependent on the rate of the adsorbing gas. It is about 20 to 650 KW, preferably 25 to 300 KW.

DETAILED DESCRIPTION OF DRAWINGS

Figure 1:
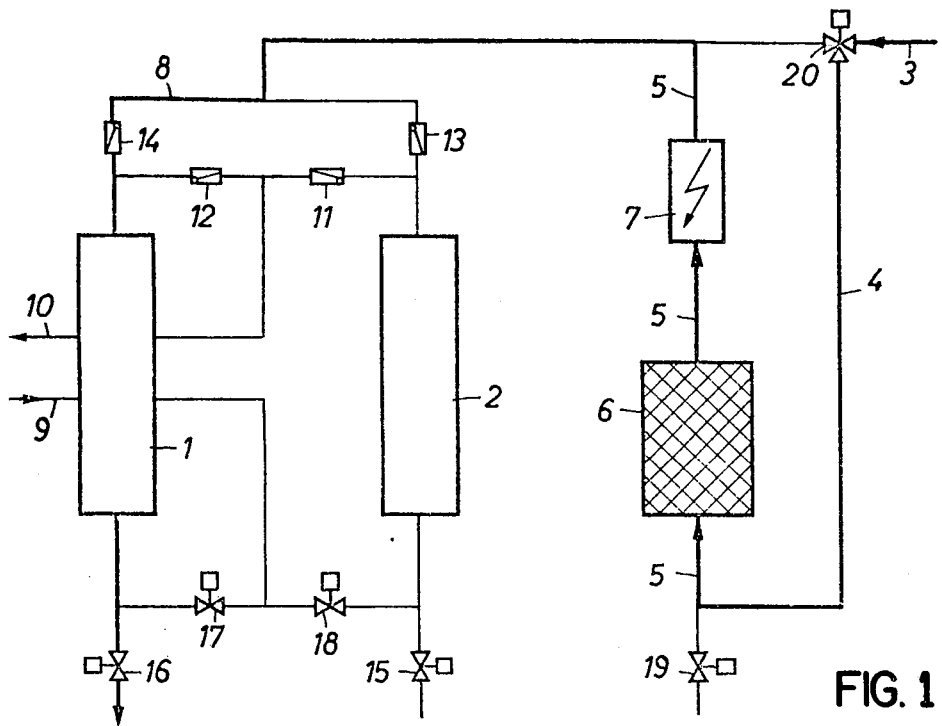
FIG. 1 is a schematic flowsheet illustrating two parallel connected adsorbers, in which one of the adsorbers is heated by regenerating gas which is passed through an accumulator and heater in series.

In FIG. 1, the passage of the regenerating gas is shown by the thick lines and arrows. The regenerating gas is passed through lines 3, 4 and 5, heat accumulator 6, where it picks up the heat stored therein, and is thereafter additionally heated in the heater 7. After being heated to the desired temperature in heater 7, the regenerating gas is passed via lines 5 and 8, into and through adsorber 1.

Simultaneously, the gas to be purified passes via line 9 into adsorber 2 and leaves adsorber 2 through line 10, as shown by the thin arrows. Valves 11 through 20 regulate the flow of regenerating gas and the gas to be purified.

Figure 2:
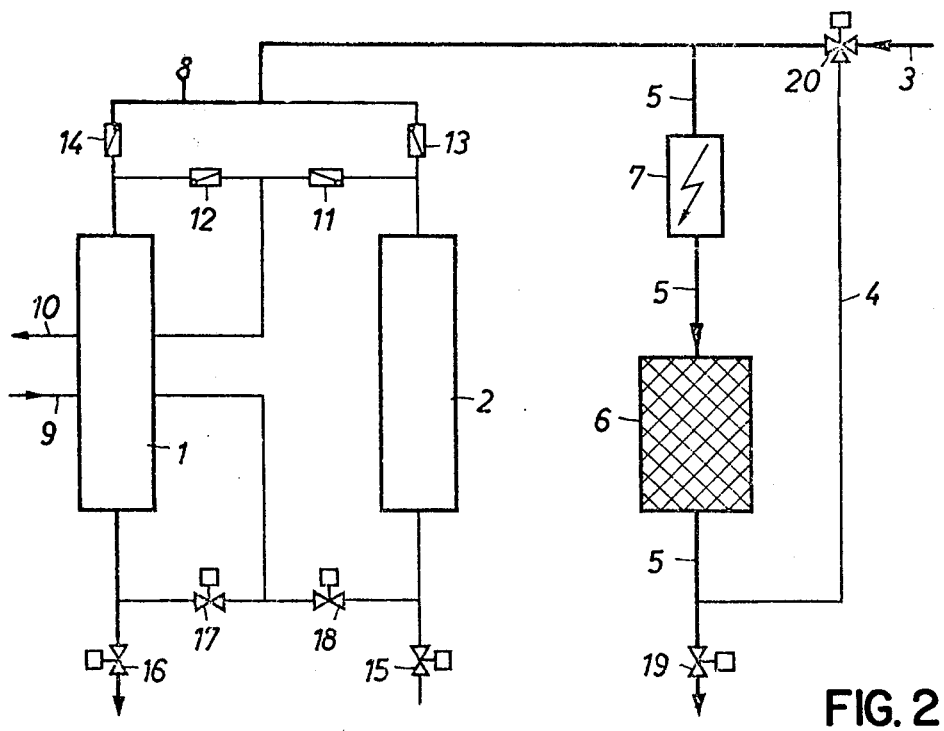
FIG. 2 illustrates the same flowsheet as in FIG. 1, but during the adsorber cooling period, during which time a partial stream of regenerating gas upstream of the adsorbers is passed through the heater and accumulator.

In FIG. 2, the passage of the regenerating gas during cooling of the adsorber is indicated by thick lines and arrows. By proper switching of the valves 11 through 20, a partial stream of the regenerating gas is branched from the main stream of regenerating gas at a point upstream of conduit 8, and is fed via line 5 in sequence across heater 7 and heat accumulator 6. Line 4 is closed off. Heat transferred into the partial stream of regenerating gas in heater 7 is essentially transferred to the packing material in heat accumulator 6. The partial stream of regenerating gas is substantially smaller than the main stream of regenerating gas, for example about a third of the main stream or less.

Figure 3:
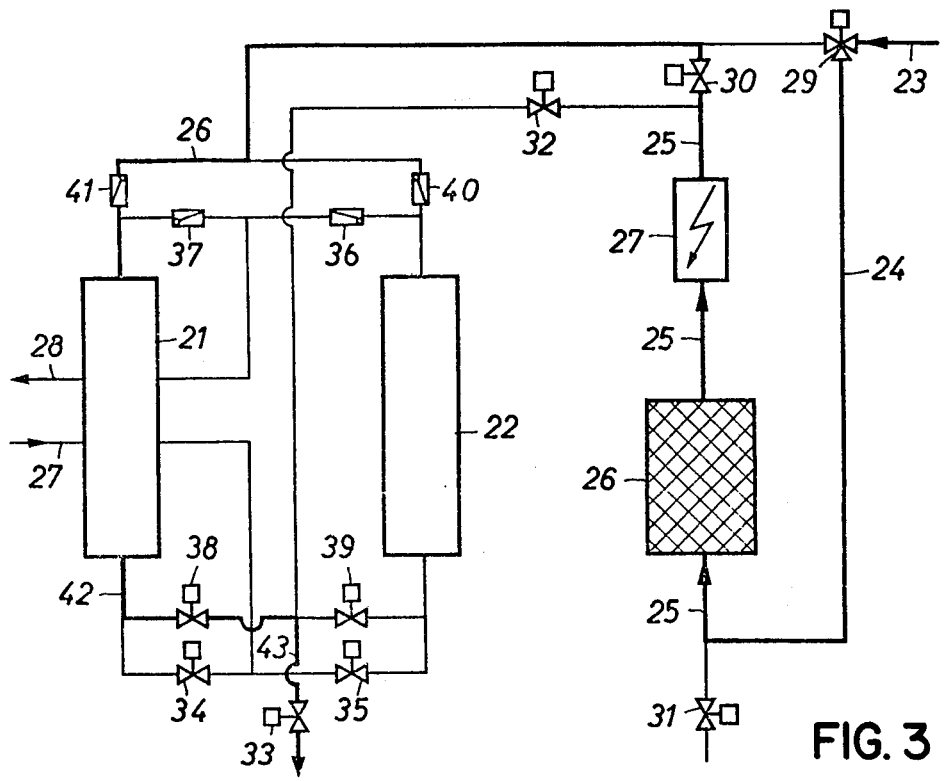
FIG. 3 is a schematic flowsheet, again illustrating two parallel connected adsorbers, but with additional valving, wherein the adsorber and regenerating gas are both heated in the same manner as in FIG. 1.

In FIG. 3, two adsorbers 21 and 22 are connected in parallel, adsorber 21 being heated by the regenerating gas. The regenerating gas flows through the lines 23, 24 and 25 through heat accumulator 26, and absorbs the accumulated heat therein. The regenerating gas is further heated in heater 27 and proceeds from there through lines 25 and 26 into and through adsorber 21. The regenerating gas is again branched off through lines 42 and 43, the passage of the regenerating gas being indicated by thick lines and arrows. While adsorber 21 is regenerated, the gas to be purified is passed via line 27 into adsorber 22 and is withdrawn from adsorber 22 through line 28, as shown by the thin arrows. Valves 29 through 41 regulate the flow of regenerating gas and the gas to be purified.

Figure 4:
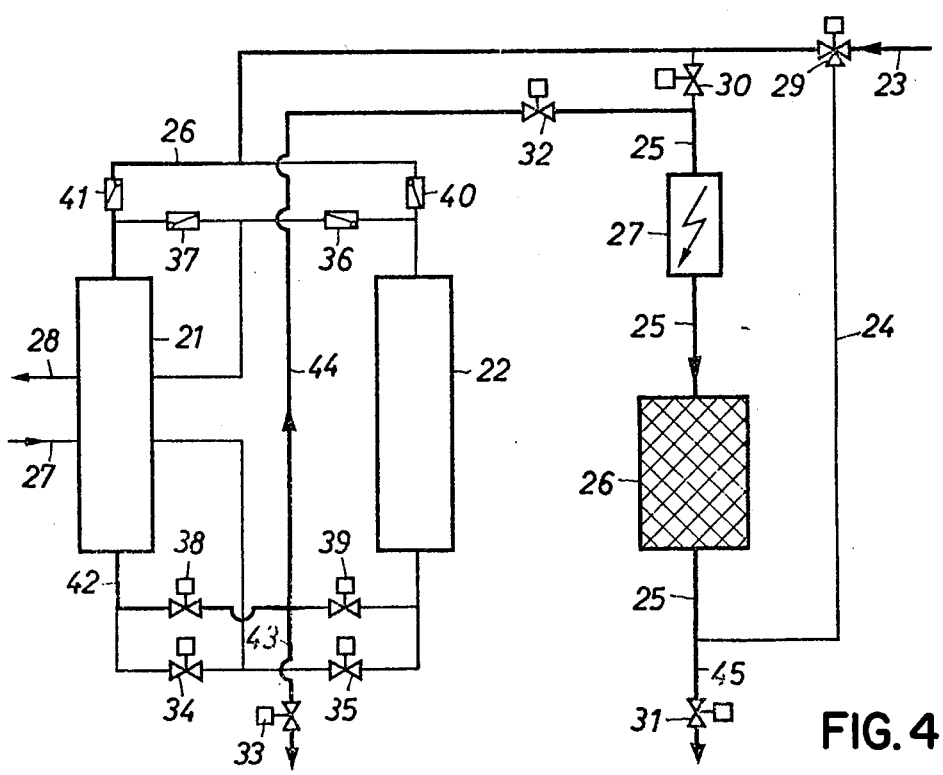
FIG. 4 illustrates the same flowsheet as shown in FIG. 3 during the cooling period of the adsorber and wherein a partial stream of regenerating gas withdrawn from the adsorber is passed across the heater and accumulator.

In FIG. 4, the same flowsheet as in FIG. 3, adsorber 21 is cooled by the main stream of the regenerating gas. In this case, the partial stream of regenerating gas is branched off the main stream of regenerating gas only after the later is discharged from absorber 21. This is done by suitable switching of valves 29 through 41, and the branched off gas is passed, via lines 42 and 44, in sequence across heater 27, heat accumulator 26 and through line 45. During cooling of the adsorber, line 24 is bypassed. The heat transferred to the partial stream of regenerating gas in heater 27 is mostly released in the heat accumulator. The passage of the regenerating gas is shown by thick lines and arrows.

Figure 5:
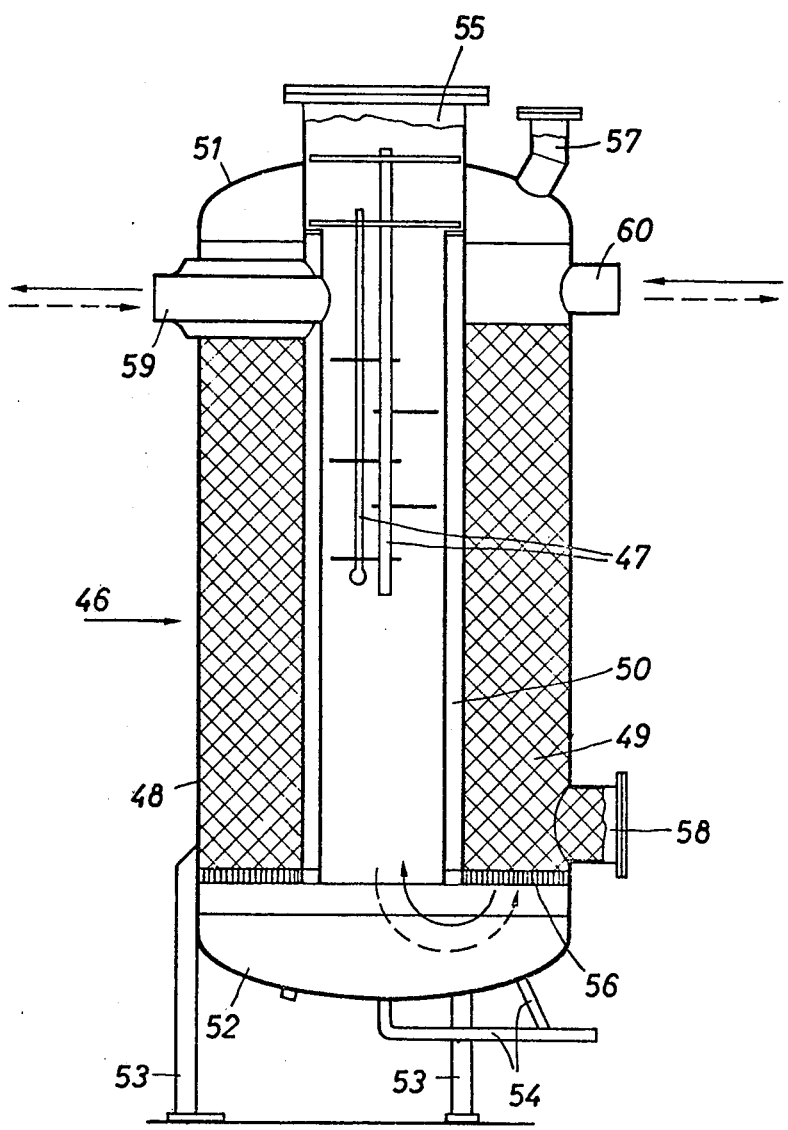
FIG. 5 is a cross-sectional view of a heater and a heat accumulator integrated into a single unit.

In FIG. 5, there is illustrated a housing 46 containing a heater 47, e.g., an electrode heater, and heat accumulator packing 49. The housing has a cylindrical midsection 48 and a top cover 51 and a bottom cover 52, and is secured on a stand 53. Conduits 54 are provided in the bottom cover 52 for the discharge. A thermally insulated pipe 50 is concentrically located within the cylindrical midsection 48, the space between the pipe 50 and the outside wall of the midsection 48 of the housing 46 being filled with said packing material, the combination of these elements forming the heat accumulator.

In the top area of pipe 50 is found the heater 47 which is connected through cover 55 to the energy supply. The accumulator packing 49 is supported on the grating 56 and can be, for example, of claybond silica bricks or any other conventional material used to store heat. A feed pipe 57 for the packing opens into top cover 51, and a closed-off handhole 58 is located toward the bottom of the cylindrical midsection 48 to permit the withdrawal of packing.

During the cooling of the adsorber, only a partial stream of regenerating gas flows in the direction of the broken line arrow through the thermally insulated nipple 59 in container 46. The partial stream of regenerating gas passes from the thermally insulated connection 59 to the thermally insulated pipe 50. The regenerating gas is heated in the insulated pipe 50 by heater 47. The regenerating gas is then reversed in flow in the bottom cover 52 and is passed through the accumulator packing material, where it substantially releases the absorbed heat, then is withdrawn via nipple 60 from the container.

During the heating period of the adsorber, the regenerating gas is passed in a direction through container 46 opposite to the path during the cooling of the adsorber, the flow direction being indicated by full line arrows. During this period, however, the entire volume of regenerating gas is passed through the housing; consequently the effective cross-sectional area for flow in the accumulator heater should be designed to accomodate the flow of the main stream of regenerating gas under the desired maximum pressure drop and gas velocity conditions.

Without further elaboration, it is believed that one skilled in the art can, using the preceding description, utilize the present invention to its fullest extent. The following preferred specific embodiments are, therefore, to be construed as merely illustrative, and not limitative of the remainder of the disclosure in any way whatsoever. In the following example, all temperatures are set forth uncorrected in degrees Kelvin; unless otherwise indicated, all parts and percentages are by weight.

EXAMPLE

In conventional adsorption systems used in air fractionation plants, the necessary regenerating gas volume is heated by a heater in a corresponding short time relative to the regenerating and adsorbing cycle. The time period of the two cycles amounts to 90 minutes each. During the period in which the adsorber is regenerated ⅕ to ¼ of this time period is needed to heat the adsorber; e.g. the adsorber adsorbs 90 minutes, then it is heated for about 22.5 to 30 minutes and finally it is cooled for about 60 to 67.5 minutes. The heater has to heat the regenerating as from 7° C to 350° C. For that purpose the heater must have a very high thermal capacity, e.g. 100 to 1500 KW.

As opposed to the above conventional system, if the heater is, as in the present invention, combined with a heat accumulator and is driven continuously, i.e. during heating as well as during cooling of the adsorber, then said heater needs to have a thermal capacity of only 20 to 650 KW. This thermal capacity is only ⅕ to ¼ of the thermal capacity of the heater in conventional adsorption systems. Aside from the smaller size of the heating means an additional advantage lies in the fact that a heater which is run continuously at a constant temperature level will offer substantially less maintenance problems than a heater which is operated with wide fluctuations.

The heater can be heated with electrical energy, gas, e.g., natural gas, or by other conventional heating means.

The preceding example can be repeated with similar success by substituting the generically or specifically described reactants and/or operating conditions of this invention for those used in the preceding example.

From the foregoing description, one skilled in the art can easily ascertain the essential characteristics of this invention, and without departing from the spirit and scope thereof, can make various changes and modifications of the invention to adapt it to various usages and conditions.

What is claimed is:

1. In an adsorption process for the separation of gases wherein gas to be separated is passed through one of several interchangeably connected absorbers, and a main stream of regenerating gas is passed in two sequential periods through another of said interchangeably connected adsorbers, the first period being an open cycle heating period to desorb the adsorbent, and the second period being an open cycle cooling period to cool the adsorbent to adsorption temperatures said stream of regenerating gas in both of said periods being from a common source, the improvement which comprises, during said cooling period, branching partial stream of regenerating gas from said main stream, heating said partial stream with heating means, and passing resultant heated partial stream over a heat accumulator, and during said heating period, passing said main stream of regenerating gas across said heat accumulator to recover heat stored in said accumulator during the cooling period, and further heating said main stream with said heating means to heating period regeneration temperature, said heating means comprising a heater yielding a source of heat independent of said adsorbers.

2. A process according to claim 1, wherein the partial stream of regenerating gas from the main stream of regenerating gas is branched off during the cooling period at a point before the main stream is passed into said one of several interchangeably connected adsorbers, and said partial stream is not heated by said adsorbers.

3. A process according to claim 1, wherein the partial stream of regenerating gas from the main stream of regenerating gas is branched off during the cooling period after being discharged from said one of several interchangeably connected adsorbers.

4. A process according to claim 3, comprising only two parallel connected adsorbers, wherein the time of the cooling period coincides with the time period during which the heat accumulator is heated up.

5. A process according to claim 3, wherein said adsorption process comprises the removal of carbon dioxide and water vapor from air, the regenerating gas is predominantly nitrogen, and of the total regeneration time devoted to each adsorber, about ⅓ to ¼ of time is devoted to said first period, and the remainder of the time is devoted to said second period.

6. A process according to claim 1, comprising only two parallel connected adsorbers, wherein the time of the cooling period coincides with the time period during which the heat accumulator is heated up.

7. A process according to claim 1, wherein said adsorption process comprises the removal of carbon dioxide and water vapor from air, the regenerating gas is predominantly nitrogen, and of the total regeneration time devoted to each absorber, about ⅓ to ¼ of time is devoted to said first period, and the remainder of the time is devoted to said second period.

8. A process according to claim 7, wherein said regenerating gas is obtained from an air fractionation column.

9. A process according to claim 7 wherein said heater is run continuously throughout the heating and the cooling of the adsorber.

10. A process according to claim 9 wherein the heater is run at a constant temperature level.

11. A process according to claim 10 comprising two parallel connected adsorbers coupled with only one heat accumulator.

12. A process according to claim 1 comprising two parallel connected adsorbers coupled with only one heat accumulator.

13. A process according to claim 1 wherein said heater is run continuously throughout the heating and the cooling of the adsorber.

14. A process according to claim 13 wherein the heater is run at a constant temperature level.

15. A heater-accumulator consisting essentially of a substantially cylindrical housing and disposed concentrically within said housing, a thermally insulated pipe, electric heating means disposed within said thermally insulated pipe, said pipe and said housing defining a concentric space; heat accumulator packing arranged in and completely filling said concentric space, a support comprising a grating for said packing, and switching valve and conduit means for allowing flow in sequence across the heat accumulator packing and heating means and vice versa.

* * * * *